US009916084B2

United States Patent
Andoh et al.

(10) Patent No.: US 9,916,084 B2
(45) Date of Patent: Mar. 13, 2018

(54) ENLARGING OR REDUCING AN IMAGE ON A DISPLAY SCREEN

(71) Applicant: International Business Machines Corporation, Armonk, NY (US)

(72) Inventors: Yasuko Andoh, Tokyo (JP); Yohichi Hattori, Yokohama (JP); Hiroaki Ohya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/421,631

(22) Filed: Feb. 1, 2017

(65) Prior Publication Data

US 2017/0139586 A1   May 18, 2017

Related U.S. Application Data

(63) Continuation of application No. 14/878,105, filed on Oct. 8, 2015.

(30) Foreign Application Priority Data

Nov. 25, 2014   (JP) ................................ 2014-238145

(51) Int. Cl.
*G06F 3/0488* (2013.01)
*G06F 3/0484* (2013.01)
*G06T 3/40* (2006.01)

(52) U.S. Cl.
CPC ...... *G06F 3/04883* (2013.01); *G06F 3/04845* (2013.01); *G06T 3/40* (2013.01); *G06T 2210/22* (2013.01)

(58) Field of Classification Search
CPC ... G06F 3/04883; G06F 3/04845; G06T 3/40; G06T 2210/22
See application file for complete search history.

(56) References Cited

U.S. PATENT DOCUMENTS 8,619,100 B2 * 12/2013 Capela ................ G06F 3/0481
                                                    345/173
8,826,189 B2 *  9/2014 Malecki .............. G06F 3/04845
                                                    345/660

(Continued)

FOREIGN PATENT DOCUMENTS

JP          05135146 A      6/1993
JP          05266167 A     10/1993

(Continued)

OTHER PUBLICATIONS

Nanjo Kazuhiro, "Proposal, Implementation and Evaluation of Multi-touch Operation toward Small Target in Touch Panel," Proceedings of the 73th National Convention of IPSJ, Interface, Computer and Human Society, Japan, Information Processing Society of Japan, 2011, vol. 4, pp. 4-303-4-304. (Reference and English translation unavailable).

(Continued)

*Primary Examiner* — Ricardo L Osorio
(74) *Attorney, Agent, or Firm* — Nathan M. Rau

(57) ABSTRACT

A method, and associated apparatus and system and program product, for enlarging or reducing an image. The image is displayed on a display screen. A pointing operation is detected. The pointing operation points to, with a single-touch gesture using pointing means on the display screen, a first figure indicative of a range of the image to be enlarged or reduced and a second figure indicative of a size of the enlarged or reduced range. In response to the detection of the pointing operation, an enlarged or reduced image is displayed after the enlarged or reduced image is obtained by enlarging or reducing the image at an enlargement or reduction ratio determined based on the first figure and the second figure.

7 Claims, 8 Drawing Sheets

(56) References Cited

U.S. PATENT DOCUMENTS

| | | | | |
|---|---|---|---|---|
| 8,854,325 | B2* | 10/2014 | Byrd | G06F 3/04883 178/18.01 |
| 8,963,873 | B2* | 2/2015 | Takeda | G06F 3/04883 345/173 |
| 9,223,406 | B2* | 12/2015 | Yuu | G06F 3/017 |
| 2011/0029917 | A1* | 2/2011 | Um | G06F 3/04883 715/800 |

FOREIGN PATENT DOCUMENTS

| | | | |
|---|---|---|---|
| JP | 05270055 | A | 10/1993 |
| JP | 07114646 | A | 5/1995 |
| JP | 07325930 | A | 12/1995 |
| JP | 11184595 | A | 7/1999 |
| JP | H11201738 | A | 7/1999 |
| JP | 2005005768 | A | 1/2005 |
| JP | 2007025993 | A | 2/2007 |
| JP | 2010271774 | A | 12/2010 |
| JP | 2013101547 | A | 5/2013 |

OTHER PUBLICATIONS

Office Action, Partial Translation—portions that apply to NPL reference 1, JP Patent Application No. 201-238145, dated Mar. 1, 2016, 1 page.

Kusumoto, T., "IrfanView32," Version 4.25, https://web.archive.org/web/20141120110206/http://www8.plala.or.jp/kusutaku/iview/, printed Feb. 1, 2017, 4 pages. (Machine Translation).

Decision to Grant a Patent, JP Patent Application No. 2014-238145, dated Apr. 19, 2016.

Andoh et al., "Enlarging or Reducing an Image on a Display Screen," U.S. Appl. No. 14/878,105, filed Oct. 8, 2015.

List of IBM Patents or Patent Applications Treated as Related, Signed Feb. 1, 2017, 2 pages.

Notification of Reasons for Refusal, JP Patent Application No. 2014-238145, dated Mar. 1, 2016, 6 pages.

* cited by examiner

ENLARGING OR REDUCING AN IMAGE ON A DISPLAY SCREEN

TECHNICAL FIELD

The present invention relates to a device and method for enlarging or reducing an image on a display screen.

BACKGROUND

On a touch panel terminal such as a smartphone, a multi-touch gesture operation for changing distance between two fingers while touching a display screen with the two fingers is common as an operation for enlarging or reducing an image displayed on the display screen.

However, there is a problem that such an operation cannot be used when an image displayed on a display screen is enlarged or reduced using a pointing device, such as a mouse, on a terminal other than the touch panel terminal.

SUMMARY

The present invention provides a method, and associated apparatus and system and program product, for enlarging or reducing an image. The image is displayed on a display screen. A pointing operation is detected. The pointing operation points to, with a single-touch gesture using pointing means on the display screen, a first figure indicative of a range of the image to be enlarged or reduced and a second figure indicative of a size of the enlarged or reduced range. In response to the detection of the pointing operation, an enlarged or reduced image is displayed after the enlarged or reduced image is obtained by enlarging or reducing the image at an enlargement or reduction ratio determined based on the first figure and the second figure.

DETAILED DESCRIPTION

Figure 1:
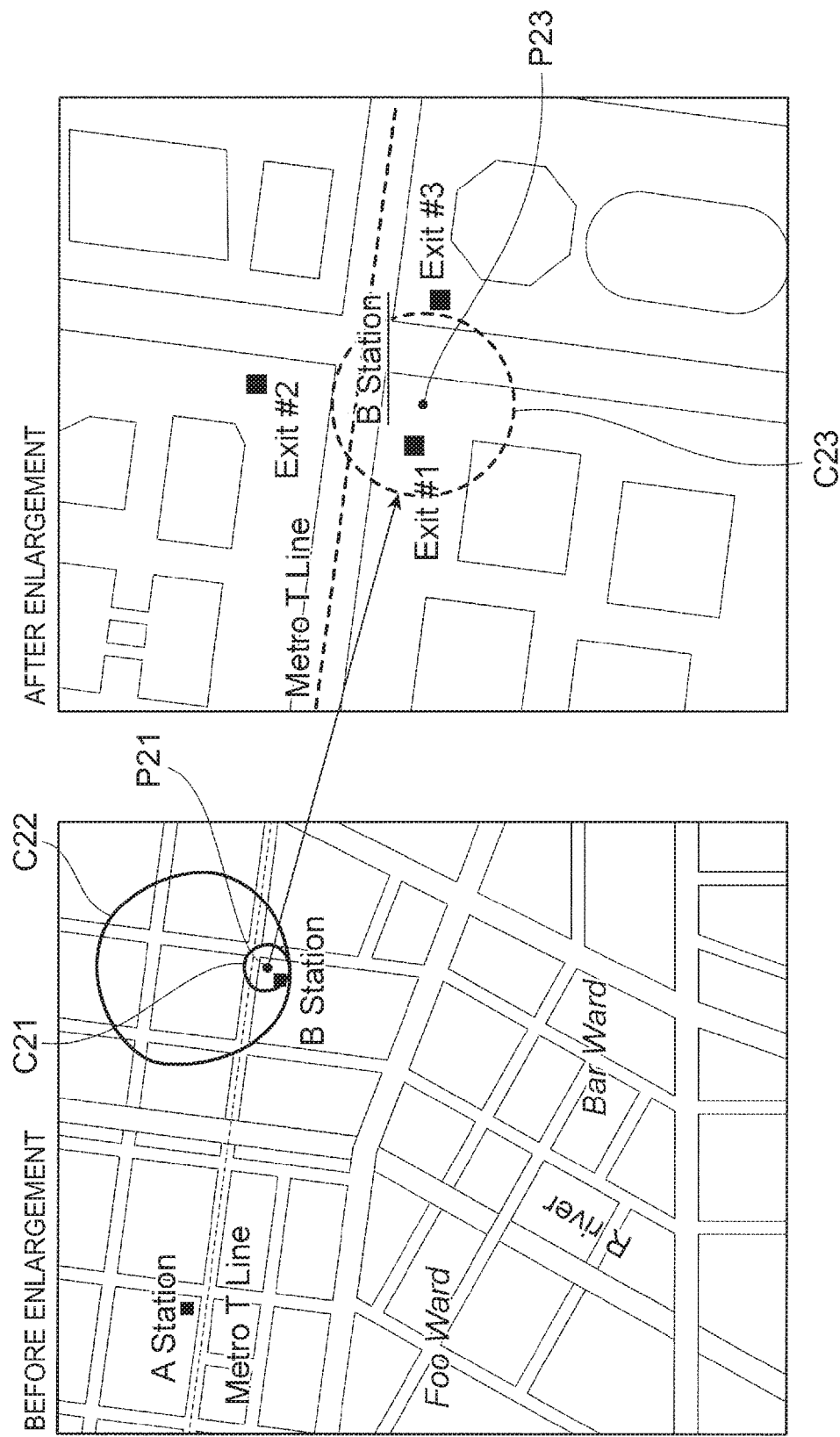
FIG. 1 contains diagrams showing an operation method for enlarging an image, in accordance with embodiments of the present invention.

The present invention may perform, with a single-touch gesture, an intuitive operation for specifying the size of an image range after being enlarged or reduced to enlarge or reduce the image.

The present invention may provide apparatus for enlarging or reducing an image, including: a display screen for displaying the image; a detection section for detecting a pointing operation that points to, with a single-touch gesture using pointing means on the display screen, a first figure indicative of a range of the image to be enlarged or reduced and a second figure indicative of a size of the enlarged or reduced range; and a control section for displaying, on the display screen in response to the detection of the pointing operation, an enlarged or reduced image obtained by enlarging or reducing the image at an enlargement or reduction ratio determined based on the first figure and the second figure.

Here, the control section may determine a ratio of the size of the second figure to the size of the first figure to be the enlargement or reduction ratio.

The control section may also display the enlarged or reduced image on the display screen around a predetermined reference point of the first figure.

The detection section may further detect a separating operation that separates the pointing means from the display screen, and, the control section may, in response further to the detection of the separating operation after the detection of the pointing operation display the enlarged or reduced image on the display screen.

Further, the detection section may detect a pointing operation that first points to the first figure and then points to the second figure.

Further, the first figure and the second figure may be approximate circles.

The present invention may also provide apparatus for enlarging or reducing an image, including: a display screen for displaying the image; a detection section for detecting a trajectory of movement of a position pointed to on the display screen with a single-touch gesture using pointing means; a recognition section for recognizing two circles from the trajectory; a determination section for determining a circle recognized from a trajectory of preceding movement for the two circles to be a first circle indicative of a range of the image to be enlarged or reduced and a circle recognized from a trajectory of subsequent movement for the two circles to be a second circle indicative of a size of the range enlarged or reduced; and a control section for displaying, on the display screen, an image enlarged or reduced at an enlargement or reduction ratio set equal to a ratio of a size of the second circle to a size of the first circle, around a center point of the first circle.

The present invention may further provide a method of enlarging or reducing an image, including the steps of: displaying the image on a display screen; detecting a pointing operation that points to, with a single-touch gesture using pointing means on the display screen, a first figure indicative of a range of the image to be enlarged or reduced and a second figure indicative of a size of the enlarged or reduced range; and displaying, on the display screen, an enlarged or reduced image obtained by enlarging or reducing the image at an enlargement or reduction ratio determined based on the first figure and the second figure in response to the detection of the pointing operation.

Further, the present invention may provide a program for causing a computer to function as apparatus for enlarging or reducing an image, the program causing the computer to function as: a display section for displaying the image on a display screen; a detection section for detecting a pointing operation that points to, with a single-touch gesture using pointing means on the display screen, a first figure indicative of a range of the image to be enlarged or reduced and a second figure indicative of a size of the enlarged or reduced range; and a control section for controlling the display section to display, on the display screen in response to the detection of the pointing operation, an enlarged or reduced image obtained by enlarging or reducing the image at an enlargement or reduction ratio determined based on the first figure and the second figure.

According to the present invention, an intuitive operation for specifying the size of an image range after being enlarged or reduced can be performed with a single-touch gesture to enlarge or reduce the image.

Embodiments of the present invention will be described in detail below with reference to the accompanying drawings.

FIG. 1 contains diagrams showing an operation method for enlarging an image, in accordance with embodiments of the present invention.

In the embodiment, an operation with pointing means such as a mouse, an electronic pen, or a finger is performed on a display screen to circle a part desired to be enlarged and arranged at the center of the display screen, and to draw, outside of the circle, a circle having a size when the part is enlarged. As a result of this operation, as shown in a diagram of FIG. 1 before the enlargement, double circles are drawn on the display screen in the sequential order of an inner small circle C21 and an outer large circle C22.

As a result, an area in the circle C21 in the diagram of FIG. 1 before the enlargement is enlarged at an enlargement ratio when the circle C21 is enlarged to the circle C22. Further, a center P21 of the circle C21 in the diagram of FIG. 1 before the enlargement moves to a center P23 of the display screen in a diagram of FIG. 1 after the enlargement. Thus, as indicated by the arrow, the area in the circle C21 in the diagram of FIG. 1 before the enlargement moves to an area in a circle C23 around a point P23 as a center in the diagram of FIG. 1 after the enlargement. Note that the enlargement of the image and the movement of the center position mentioned above are performed at timing when the pointing means is separated from the display screen after the drawing of the double circles is completed.

Figure 2:
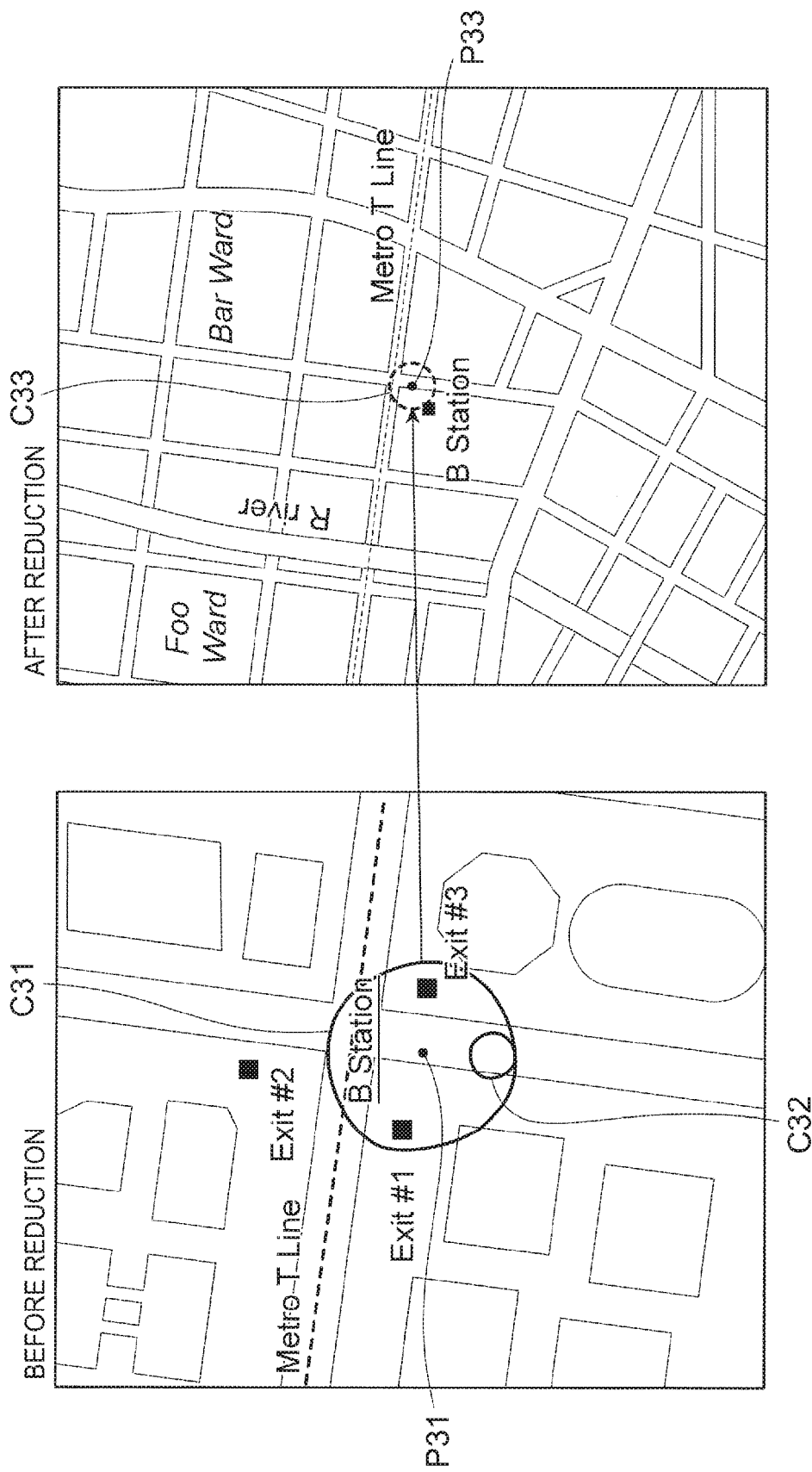
FIG. 2 contains diagrams showing an operation method for reducing an image, in accordance with embodiments of the present invention.

FIG. 2 contains diagrams showing an operation method for reducing an image, in accordance with embodiments of the present invention.

In the embodiment, an operation with pointing means such as a mouse, an electronic pen, or a finger on the display screen is performed to circle a part desired to be reduced and arranged at the center of the display screen, and to draw, inside of the circle, a circle having a size when the part is reduced. As a result of this operation, as shown in a diagram of FIG. 2 before the reduction, double circles are drawn on the display screen in the sequential order of an outer large circle C31 and an inner small circle C32.

As a result, an area in the circle C31 in the diagram of FIG. 2 before the reduction is reduced at a reduction ratio when the circle C31 is reduced to the circle C32. Further, a center P31 of the circle C31 in the diagram of FIG. 2 before the reduction moves to a center P33 of the display screen in a diagram of FIG. 2 after the reduction. Thus, as indicated by the arrow, the area in the circle C31 in the diagram of FIG. 2 before the reduction moves to an area in the circle C33 around the point P33 as a center in the diagram of FIG. 2 after the reduction. Note that the reduction of the image and the movement of the center position mentioned above are performed at timing when the pointing means is separated from the display screen after the drawing of the double circles is completed.

Here, a method for the image display device in the embodiment to realize the enlargement and reduction of such an image will be described.

Though not shown in FIG. 1 and FIG. 2, a resize button is provided in the embodiment. This resize button is a button for the image display device to initiate an operation. When the resize button is held down, the image display device starts tracing a single-stroke trajectory of the pointing means.

Specifically, the image display device traces the trajectory of the pointing means as follows, namely: After the resize button is held down, a position next pointed by the pointing means is recognized as a starting point of the single stroke to trace the trajectory of the pointing means. When the single stroke of the pointing means is completed, the tracing of the trajectory is terminated.

Figure 3:
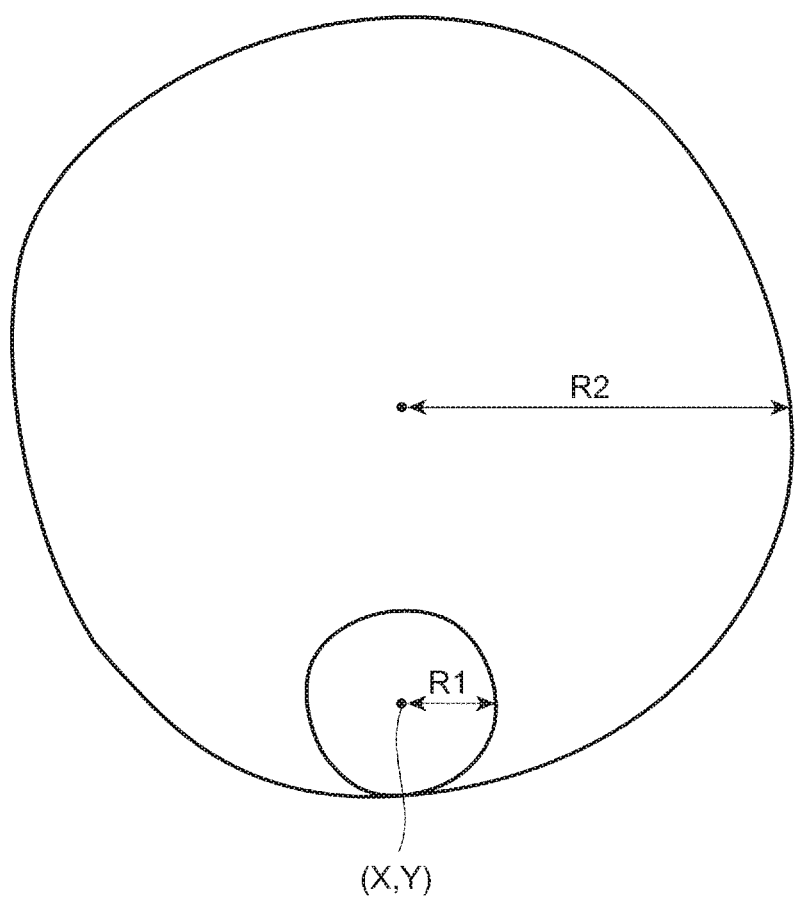
FIG. 3 is a diagram showing circular regions recognized on an image by an image display device, in accordance with embodiments of the present invention.

Thus, the image display device recognizes circular regions on an image. FIG. 3 is a diagram showing the circular regions, in accordance with embodiments of the present invention. First, from the single-stroke trajectory of the pointing means, the image display device determines two approximate circles as shown. Then, the radius of a first-drawn circle is set as R1 and the radius of a next-drawn circle is set as R2. Further, the coordinates of the center of the first-drawn circle are set as (X, Y). Assuming in FIG. 3 that a small circle is first drawn and a large circle is drawn next, the radius of the small circle is set as R1, the radius of the large circle is set as R2, and the coordinates of the center of the small circle are set as (X, Y).

After that, the image display device resizes the image and sets the position of the image.

First, a case where the small circle and the large circle are drawn in this sequential order to enlarge the image will be described. In this case, the image display device enlarges the image at an enlargement ratio (R2/R1) when the small circle is enlarged to the large circle. Then, the image display device moves, to the center of the display screen, the coordinates (X, Y) of a point as the center of the small circle.

Next, a case where the large circle and the small circle are drawn in this sequential order to reduce the image will be described. In this case, the image display device reduces the image at a reduction ratio (R2/R1) when the large circle is reduced to the small circle. Then, the image display device moves, to the center of the display screen, the coordinates (X, Y) of a point as the center of the large circle.

Thus, the image display device enlarges the image at the specified enlargement ratio (R2/R1) or reduces the image at the specified reduction ratio (R2/R1). Then, the image display device moves the image so that the specified coordinates (X, Y) of a point on the image will come to the center position of the display screen. When the image is reduced, an image located outside of the display screen before the reduction is also displayed on the display screen.

Figure 4:
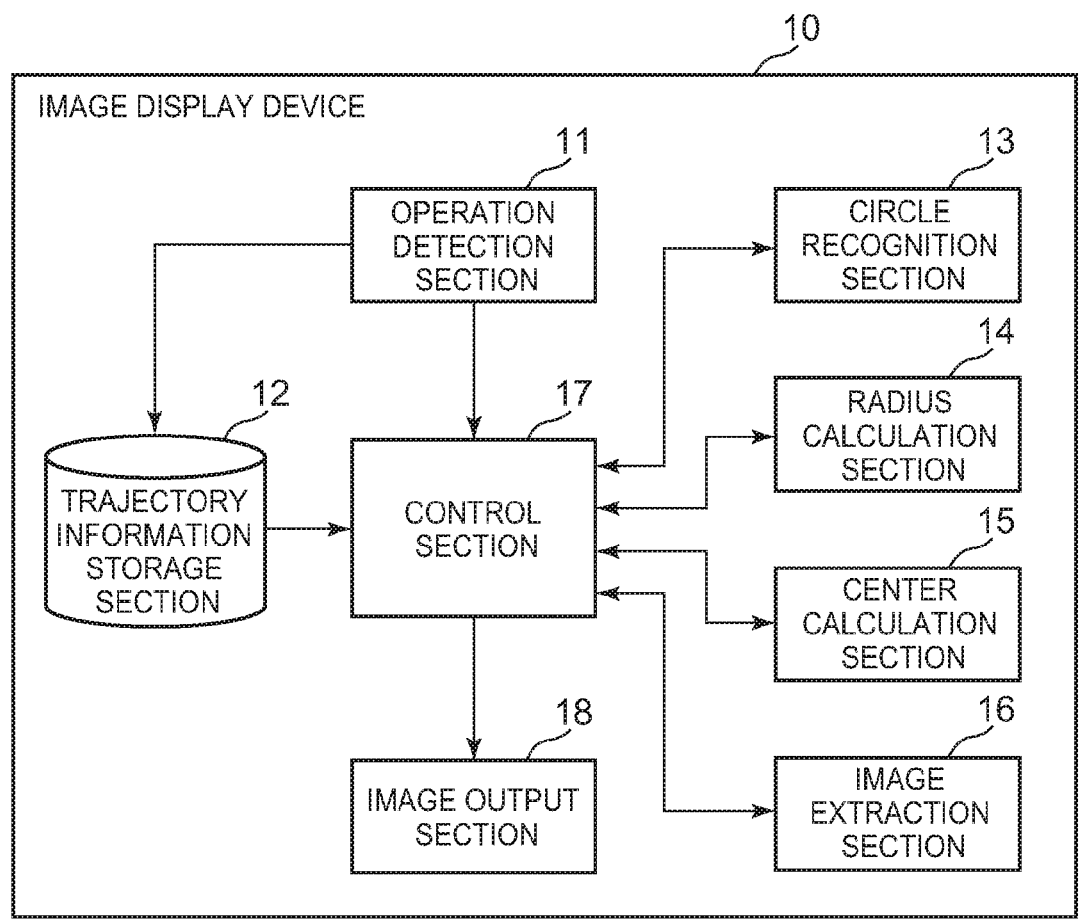
FIG. 4 is a block diagram showing a functional configuration example of the image display device for enlarging or reducing an image, in accordance with embodiments of the present invention.

FIG. 4 is a block diagram showing an example of the functional configuration of such an image display device 10 for enlarging and reducing an image, in accordance with embodiments of the present invention. As shown, this image display device 10 includes an operation detection section 11, a trajectory information storage section 12, a circle recognition section 13, a radius calculation section 14, a center calculation section 15, an image extraction section 16, a control section 17, and an image output section 18.

The operation detection section 11 detects an operation for holding down the resize button on the display screen using pointing means, an operation for drawing a single stroke on the display screen with the pointing means, and an operation for separating the pointing means from the display screen. In the embodiment, the operation detection section 11 is provided as an example of a detection section for detecting a pointing operation for pointing figures using the pointing means or the trajectory of movement of a position pointed by the pointing means. The operation detection section 11 is also provided as an example of a detection section for detecting a separating operation for separating the pointing means from the display screen.

The trajectory information storage section 12 stores trajectory information in which information on the coordinates on the display screen obtained when the operation detection section 11 detects a single-stroke operation is associated with information on the time when the coordinates are pointed to.

The circle recognition section 13 recognizes two circles from the coordinate information included in the trajectory information stored in the trajectory information storage section 12. This recognition of the two circles may be done by using a known method such as Hough transform. In the embodiment, the circle recognition section 13 is provided as an example of a recognition section for recognizing two circles from a trajectory.

From the two circles recognized by the circle recognition section 13, the radius calculation section 14 determines a firstly drawn first circle and a subsequently drawn second circle. This determination on the first circle and the second circle may be made, for example, by setting, as the first circle, a circle recognized from information on the coordinates associated with information on the preceding time and setting, as the second circle, a circle recognized from information on the coordinates associated with information on the subsequent time. The first circle is a circle meant to designate the range of an image as a reference, and the second circle is a circle meant to designate the size after the range is enlarged or reduced. Then, the radius calculation section 14 calculates the radius R1 of the first circle and the radius R2 of the second circle.

From the two circles recognized by the circle recognition section 13, the center calculation section 15 determines the firstly drawn first circle. This determination on the first circle may be made, for example, by setting, as the first circle, a circle recognized from information on the coordinates associated with information on the preceding time. The first circle is a circle meant to designate the range of an image desired to be placed at the center of the display screen. Then, the center calculation section 15 calculates the coordinates (X, Y) of the center of the first circle. Estimating the center (X, Y) and radius (R) of as circle from noisy points on the circumference of the circle is well known in the art (e.g., Hough transform).

The image extraction section 16 obtains an enlarged or reduced image by enlarging or reducing an image displayed on the display screen at an enlargement or reduction ratio set equal to a ratio of the radius R2 of the second circle to the radius R1 of the first circle, and extracts, from this image, an image part corresponding to a size of the display screen around a position on the image at which the coordinates (X, Y) of the center of the first circle is located.

The control section 17 reads the trajectory information from the trajectory information storage section 12, and gives this trajectory information to control the circle recognition section 13 to recognize the two circles. The control section 17 also gives the two circles and the trajectory information to control the radius calculation section 14 and the center calculation section 15 to calculate the radii of the first circle and the second circle, and the coordinates of the center of the first circle. The control section 17 further gives these radii and the coordinates of the center to control the image extraction section 16 to obtain an enlarged or reduced image by enlarging or reducing an image displayed on the display screen at an enlargement or reduction ratio set equal to a ratio of the radius R2 of the second circle to the radius R1 of the first circle and extract a part of the image corresponding to a size of the display screen around the coordinates (X, Y) of the center of the first circle. Further, the control section 17 gives this enlarged or reduced image part to control the image output section 18 to output and display the image part on the display screen. In the embodiment, the control section 17 is provided as an example of a control section for displaying, on the display screen, an enlarged or reduced image obtained by enlarging or reducing the image, and an example of a control section for displaying, on the display screen, the enlarged or reduced image around the center point of the first circle.

The image output section 18 outputs the enlarged or reduced image part obtained by the control section 17 to a display mechanism 90d (see FIG. 8) to display the part of the image on the display screen. In the embodiment, the image output section 18 is provided as an example of a display section for displaying the image on the display screen.

Note that in this functional configuration example, the radius calculation section 14 determines the firstly drawn first circle and the subsequently drawn second circle, and the center calculation section 15 determines the firstly drawn first circle. However, the function of determining the firstly drawn first circle and the subsequently drawn second circle may be provided separately from the radius calculation section 14 and the center calculation section 15. Alternatively, the function of determining the firstly drawn first circle and the subsequently drawn second circle may be included in the circle recognition section 13. In this case, the function of determining the firstly drawn first circle and the subsequently drawn second circle is an example of a determination section for determining the first circle indicative of a range of enlarging or reducing the image and the second circle indicative of a size when the range is enlarged or reduced.

Figure 5:
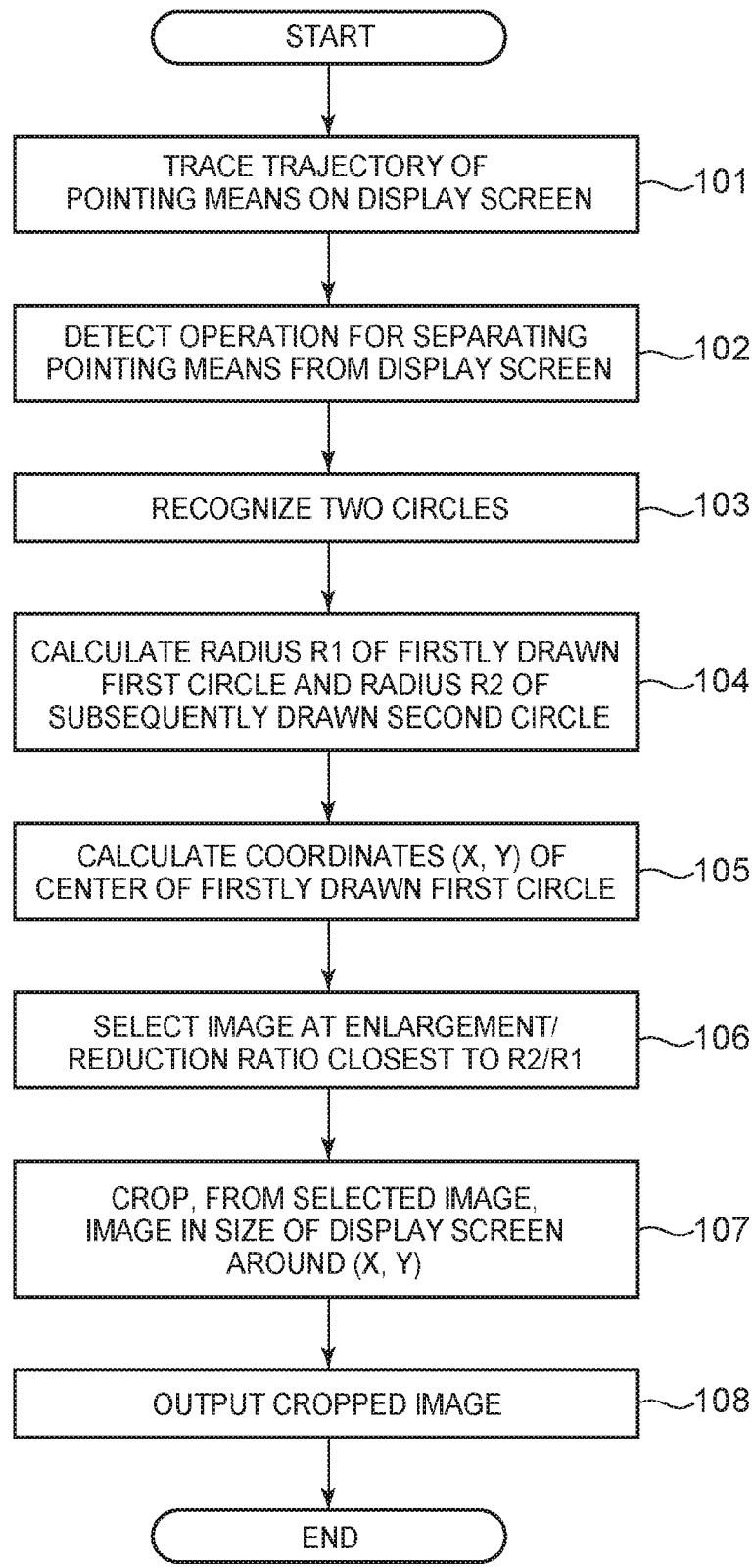
FIG. 5 is a flowchart showing an operation example when the image display device enlarges and reduces an image, in accordance with embodiments of the present invention.

FIG. 5 is a flowchart showing an operation example when the image display device 10 enlarges and reduces an image, in accordance with embodiments of the present invention. Note that this operation is started when the operation detection section 11 detects that the above-mentioned resize button is held down.

When the operation is started, the operation detection section 11 in the image display device 10 traces the single-stroke trajectory of the pointing means on the display screen (step 101). Here, each time the display screen is pointed by the pointing means, the operation detection section 11 detects the pointing, and stores, in the trajectory information storage section 12, trajectory information in which information on the time when the pointing was done and information on the coordinates at which the pointing was done are associated with each other.

In one embodiment, step 101 performs: (i) detecting a first trajectory traced by a first movement of a position pointed to on the display screen with a single-touch gesture of a pointing means; and (ii) detecting a second trajectory traced by a second movement of a position pointed to on the display screen with a single-touch gesture of the pointing means.

After step 101, the operation detection section 11 detects the operation for separating the pointing means from the display screen (step 102). This causes the operation detection section 11 to finish tracing the trajectory of the pointing means, and informs the control section 17 of that effect. In one embodiment, step 102 determines that the second movement tracing the second trajectory occurred after the first trajectory was traced.

The control section 17 first controls the circle recognition section 13 to cause the circle recognition section 13 to recognize two circles based on the trajectory information stored in the trajectory information storage section 12 (step 103). Specifically, the circle recognition section 13 uses a known method such as Hough transform to recognize the two circles from the coordinate information included in the trajectory information. In one embodiment, step 103 determines that (i) the first trajectory is a first noisy circle having a radius R1 and centered at a spatial location (X,Y) on the display screen and (ii) the second trajectory is a second noisy circle having a radius R2, wherein either R1<R2 or R1>R2. A noisy circle is an approximate circle having deviations from a perfect circle in the trajectory traced by the pointing device.

Next, the control section 17 controls the radius calculation section 14 to cause the radius calculation section 14 to calculate the radius R1 of a firstly drawn first circle of the two circles and the radius R2 of a subsequently drawn second circle of the two circles (step 104). Specifically, of the two circles recognized in step 103, one recognized from coordinate information associated with information on the preceding time is set as the first circle, and the other recognized from coordinate information associated with information on the subsequent time is set as the second circle. Then, of the radii of the two circles given by the known method (e.g., Hough transform) used to recognize the circles, one given as the radius of the first circle is set as the radius R1, and the other given as the radius of the second circle is set as the radius R2.

Then, the control section 17 controls the center calculation section 15 to cause the center calculation section 15 to calculate the coordinates (X, Y) of the center of the firstly drawn first circle of the two circles (step 105). Specifically, of the two circles recognized in step 103, one recognized from coordinate information associated with information on the preceding time is set as the first circle. Then, of the coordinates of the centers of the two circles given by the known method (e.g., Hough transform) used to recognize the circles, those given as the coordinates of the center of the first circle are set as the coordinates (X, Y).

As a result in one embodiment, the control section 17 controls the image extraction section 16 to cause the image extraction section 16 to select an image enlarged or reduced at an enlargement ratio or a reduction ratio closet to R2/R1 from among multiple stored images enlarged or reduced at multiple enlargement ratios or reduction ratios prepared beforehand (step 106).

Then, an image in a size of the display screen around (X, Y) calculated in step 105 is cropped from this selected image (step 107).

After step 106, the control section 17 controls the image output section 18 to cause the image output section 18 to output the image cropped in step 107 to the display mechanism 90d (see FIG. 8) (step 108). Alternatively in step 108, the enlarged or reduced image may be displayed as enlarged or as reduced by a scale factor of about a ratio of R2/R1 and may be cropped as in step 107. In one embodiment, displaying the enlarged or reduced image comprises displaying the enlarged or reduced image with the spatial location (X,Y) being centered on the display screen.

In this operation example, the circle first drawn of the two circles is set as the first circle and the circle subsequently drawn of the two circles is set as the second circle in step 104 and step 105, but the present invention is not limited thereto. The circle subsequently drawn of the two circles may be set as the first circle and the circle first drawn of the two circles may be set as the second circle.

Further, in this operation example, an image at the enlargement or reduction ratio closest to R2/R1 is selected in step 106 from among images at the multiple enlargement or reduction ratios to obtain an enlarged or reduced image, but the present invention is not limited thereto. For example, an image displayed on the display screen may be enlarged or reduced by setting R2/R1 as the enlargement or reduction ratio to obtain an enlarged or reduced image.

In the embodiment, it is assumed that an image range is pointed on the display screen with a single stroke of the pointing means, but the present invention may not necessarily assume that the image range is pointed with a single stroke. It is only necessary to assume that the image range is pointed on the display screen with at least a single-touch gesture of the pointing means.

Further, in the embodiment, it is assumed that circles are drawn on the display screen with the pointing means, but the present invention may not necessarily assume that circles are drawn. It is only necessary to assume that some kind of figure is drawn on the display screen with the pointing means. As such a figure, a quadrangle other than the circle can be considered.

Further, in the embodiment, the radius of the second circle to the radius of the first circle is set as the enlargement or reduction ratio on the assumption that the circles are drawn on the display screen with the pointing means, but the present invention is not limited thereto. In consideration of the case where any figure other than the circle is drawn on the display screen with the pointing means, it may be generalized that the size of a second figure to the size of a first figure is set as the enlargement or reduction ratio. Further, the enlargement or reduction ratio may be determined based on the first figure and the second figure, rather than setting the size of the second figure to the size of the first figure directly as the enlargement or reduction ratio. As such a determination method for the enlargement or reduction ratio, a method of setting N multiple of a ratio of the size of the second figure to the size of the first figure as the enlargement or reduction ratio can be considered.

Furthermore, in the embodiment, the position of the center of a circle on an image is moved to the center of the display screen on the assumption that the circle is drawn on the display screen with the pointing means, but the present invention is not limited thereto. In consideration of the case where any figure other than the circle is drawn on the display screen with the pointing means, it may be generalized that the position of a predetermined reference point of the figure on the image is moved to the center of the display screen. When the figure is a quadrangle, such a predetermined reference point can be considered to be a four-cornered point of the quadrangle.

As described above, in the embodiment, an image range and a size after the range is enlarged or reduced are pointed on the display screen with a single-touch gesture of the pointing means to enlarge or reduce an image displayed on the display screen. This enables even a device pointing one point such as a mouse or an electronic pen to enlarge or reduce an image unlike the method of changing distance between two fingers while touching the display screen with the two fingers. Further, unlike a method of enlarging or reducing an image with a click or double-click of a mouse, the image can be enlarged or reduced at a specified enlargement or reduction ratio irrespective of a predetermined enlargement or reduction ratio.

Further, in the embodiment, an image is so moved that the center of an image range pointed on the display screen with a single-touch gesture of the pointing means will be displayed at the center of the display screen. This enables a change in image part to be displayed on the display screen simultaneously with the enlargement or reduction of the image.

Figure 6:
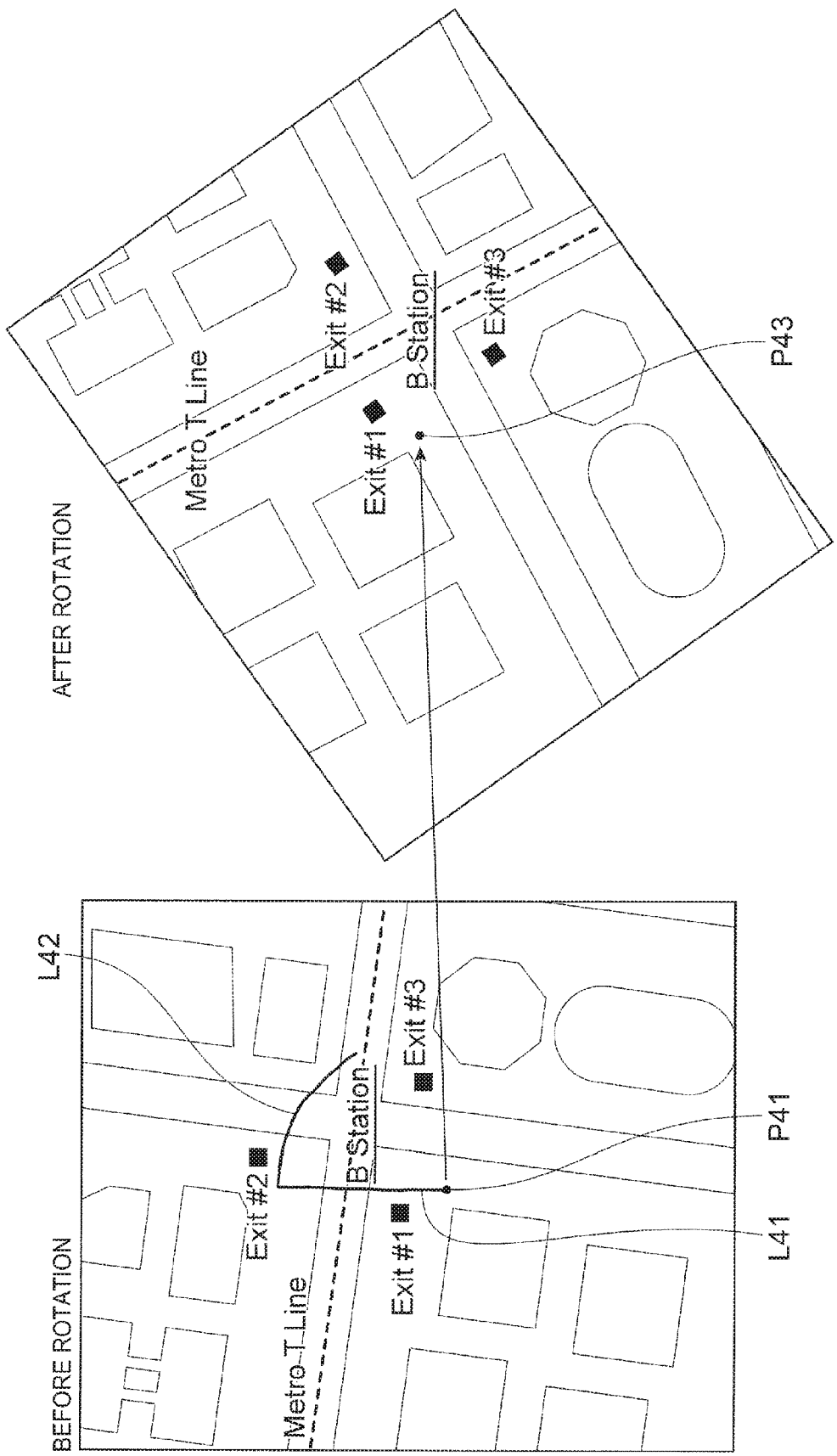
FIG. 6 contains diagrams showing an operation method for rotating an image, in accordance with embodiments of the present invention.

FIG. 6 contains diagrams showing an operation method for rotating an image, in accordance with embodiments of the present invention.

In the embodiment, an operation for drawing a straight line on the display screen with pointing means, such as a mouse, an electronic pen, or a finger, from a part desired to be placed at the center of the display screen, and in connection with the straight line, drawing an arc corresponding to an angle to be rotated is performed. According to this operation, a straight line L41 and an arc line L42 are drawn on the display screen in this sequential order as shown in a diagram of FIG. 6 before the rotation to specify a point desired to be placed at the center of the display screen and an angle of rotation.

As a result, the entire image in the diagram of FIG. 6 before the rotation rotates by an angle between the straight line L41 and the arc line L42 around a starting point P41 of the straight line L41. Further, the starting point P41 of the straight line L41 in the diagram of FIG. 6 before the rotation moves to a center P43 of the display screen in a diagram of FIG. 6 after the rotation. When characters are displayed on the image, it is assumed that the characters are displayed horizontally in a corresponding position on the image after the rotation as shown in the diagram of FIG. 6 after the rotation.

Here, a method for the image display device in the embodiment to realize the rotation of such an image will be described.

Though not shown in FIG. 6, a rotate button is provided in the embodiment. This rotate button is a button for the image display device to initiate an operation. When the rotate button is held down, the image display device starts tracing a single-stroke trajectory of the pointing means.

Specifically, the image display device trances the trajectory of the pointing means as follows, namely: After the rotate button is held down, a position next pointed by the pointing means is recognized as a starting point of the single stroke, and the trajectory of the pointing means is traced. Then, when the single stroke of the pointing means is completed, the tracing of the trajectory is terminated.

Figure 7:
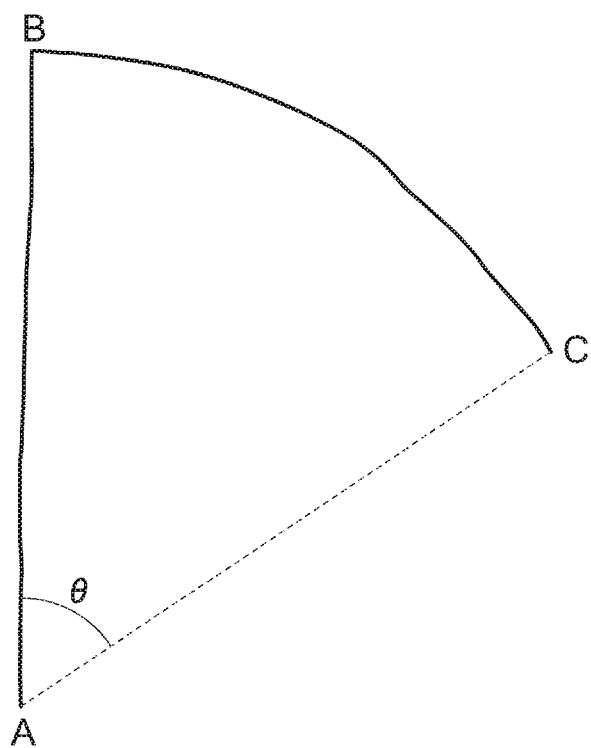
FIG. 7 is a diagram for describing a recognition method of the center and angle of rotation by the image display device, in accordance with embodiments of the present invention.

Thus, the image display device recognizes the center and angle of rotation on the image. FIG. 7 is a diagram for describing a recognition method of the center and angle, in accordance with embodiments of the present invention. First, the image display device determines a starting point of the straight line from the single-stroke trajectory of the pointing means, and sets the starting point as point A that is the center of rotation of the image. Then, when the trajectory is curved in a direction at a predetermined angle (e.g., 120 degrees) or less to the straight line, the curved point is set as point B, and a line from the point is set as an arc line.

Further, a point at which the pointing means is separated from the display screen is set as point C.

After that, the image display device rotates the image. Specifically, the entire image is rotated at an angle θ between a straight line connecting point A and point B and a straight line connecting point A and point C.

At this time, when characters are superimposed and displayed on the image, it is assumed that the image display device displays the characters horizontally in a position on the rotated image corresponding to the position in which the characters were displayed before the rotation.

In the embodiment, it is assumed that the center and angle of rotation are pointed on the display screen with a single stroke of the pointing means, but the present invention may not necessarily assume that the center and angle of rotation are pointed with the single stroke. It is only necessary to assume that the center and angle of rotation are pointed on the display screen with at least a single-touch gesture of the pointing means.

As described above, in the embodiment, the center and angle of rotation are pointed on the display screen with a single-touch gesture of the pointing means to rotate an image displayed on the display screen. This enables even a device pointing one point such as a mouse or an electronic pen to rotate an image unlike a method of rotating one finger about the other finger as a supporting point while touching the display screen with the two fingers. Further, unlike a method of rotating a figure around a reference point preset in the figure, the image can be rotated around a point selected by a user.

Further, in the embodiment, the image is so moved that the center of rotation pointed on the display screen with a single-touch gesture of the pointing means will be displayed at the center of the display screen. This enables a change in image part to be displayed on the display screen simultaneously with the rotation of the image.

Figure 8:
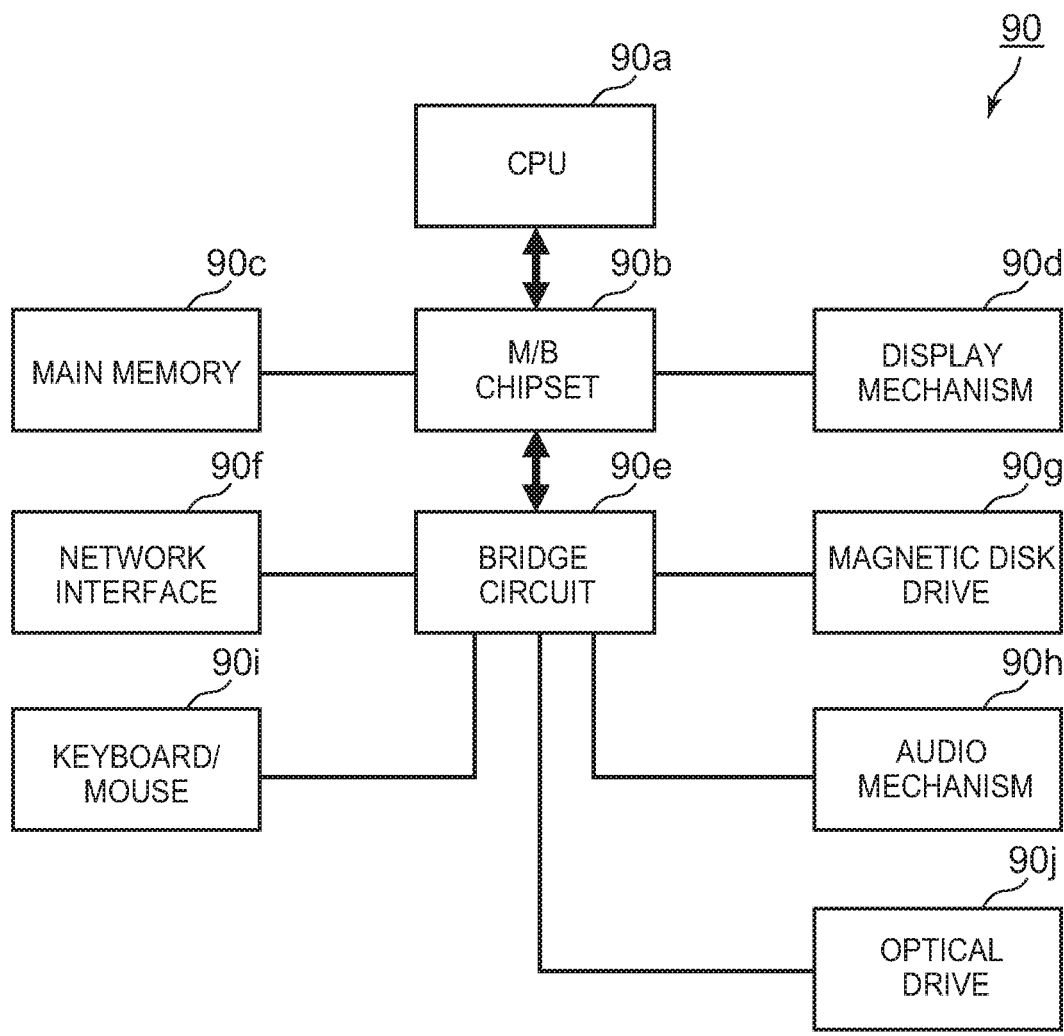
FIG. 8 is a diagram showing an example of the hardware configuration of a computer to which embodiments of the present invention is applicable.

FIG. 8 is a diagram showing an example of the hardware configuration of a computer 90 to which the embodiments of the present invention is applicable. As shown, the computer 90 includes a CPU (Central Processing Unit) 90a as computing means, a main memory 9c connected to the CPU 90a through an M/B (motherboard) chipset 9b, and the display mechanism 90d connected to the CPU 90a through the M/B chipset 90b as well. Further, a network interface 90f, a magnetic disk drive (HDD) 90g, an audio mechanism 90h, a keyboard/mouse 90i, and an optical drive 90j are connected to the M/B chipset 90b through a bridge circuit 90e.

In FIG. 8, each component is connected through a bus. For example, the CPU 90a and the M/B chipset 90b, and the M/B chipset 90b and the main memory 90c are connected through a CPU bus. Although the M/B chipset 90b and the display mechanism 90d may be connected through an AGP (Accelerated Graphics Port), if the display mechanism 90d includes a PCI Express-capable video card, the M/B chipset 90b and this video card will be connected through a PCI Express (PCIe) bus. Further, for connection with the bridge circuit 90e, PCI Express, for example, can be used for the network interface 90f. For the magnetic disk drive 90g, for example, serial ATA (AT Attachment), parallel transfer ATA, or PCI (Peripheral Components Interconnect) can be used. Further, a USB (Universal Serial Bus) can be used for the keyboard/mouse 90i and the optical drive 90j.

Here, the present invention may be implemented all in hardware, or all in software, or in both hardware and software. Further, the present invention can be implemented as a computer, a data processing system, or a computer program. This computer program can be stored on a computer-readable medium and provided. Here, the medium may be an electronic, magnetic, optical, electromagnetic, infrared, or semiconductor system (apparatus or device), or a propagation medium. Further, a semiconductor or solid-state storage device, a magnetic tape, a removable computer diskette, a random access memory (RAM), a read-only memory (ROM), a rigid magnetic disk, and an optical disk are exemplified as computer-readable media. Examples of optical disks so far include a compact disk read-only memory (CD-ROM), a compact disk read/write (CD-R/W), and a DVD.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention is described with reference to the embodiment, the technical scope of the present invention is not limited to the aforementioned embodiment. It is obvious to those skilled in the art that various changes and alternatives are possible without departing from the scope and spirit of the present invention.

What is claimed is:

1. A method for enlarging or reducing an image on a display screen of a computer system, said method comprising:

detecting, by a processor of the computer system, a pointing operation that points to, with a single touch gesture of a pointing means on the display screen, a first-drawn figure indicative of a range of the image to be enlarged or reduced and a second-drawn figure indicative of a size of the enlarged or reduced range;

detecting, on the display screen by the processor, a first trajectory traced by a first movement of a position pointed to on the display screen with a single-touch gesture of a pointing means;

detecting, by the processor, a second trajectory traced by a second movement of a position pointed to on the display screen with a single-touch gesture of the pointing means;

determining, by the processor, that the second movement tracing the second trajectory occurred after the first trajectory was traced;

determining, by the processor, that the first trajectory is a first noisy circle having a radius R1;

determining, by the processor, that the second trajectory is a second noisy circle having a radius R2, wherein either R1<R2 or R1>R2;

recognizing the first-drawn figure and the second-drawn figure; and displaying, on the display screen in response to the detection of the pointing operation, an enlarged or reduced image obtained by enlarging or reducing the image at an enlargement or reduction ratio determined based on the first-drawn figure and the second-drawn figure, wherein in response to having determined that R1<R2 or having determined that R1>R2, the image is enlarge or reduced, respectively, either by a scale factor of about a ratio of R2/R1 or by a selection of an image of multiple stored images having different respective enlargement ratios or reduction ratios with respect to the first noisy circle.

2. The method of claim 1, wherein said determining that the first trajectory is said first noisy circle having the radius R1 comprises determining that first noisy circle is centered at a spatial location (X, Y) on the display screen, and wherein said displaying the enlarged or reduced image comprises displaying the enlarged or reduced image with the spatial location (X, Y) being centered on the display screen.

3. The method of claim 1, wherein R1<R2.

4. The method of claim 1, wherein R1>R2.

5. The method of claim 1, wherein said displaying the enlarged or reduced image comprises displaying the enlarged or reduced image by the scale factor of about the ratio of R2/R1.

6. The method of claim 1, wherein said displaying the enlarged or reduced image comprises displaying the enlarged or reduced image by selection of an image of multiple pre-stored images having different respective enlargement ratios or reduction ratios with respect to the first noisy circle.

7. The method of claim 1, wherein said displaying the enlarged or reduced image comprises displaying the enlarged or reduced image as cropped.

* * * * *